US006629495B2

(12) United States Patent
Nakamura et al.

(10) Patent No.: US 6,629,495 B2
(45) Date of Patent: Oct. 7, 2003

(54) METHOD OF AND APPARATUS FOR MAKING HEAT-SENSITIVE STENCIL AND HEAT-SENSITIVE STENCIL MATERIAL

(75) Inventors: Jun Nakamura, Ibaraki-ken (JP); Kenji Ohshima, Ibaraki-ken (JP)

(73) Assignee: Riso Kagaku Corporation (JP)

( * ) Notice: Subject to any disclaimer, the term of this patent is extended or adjusted under 35 U.S.C. 154(b) by 12 days.

(21) Appl. No.: 09/858,464

(22) Filed: May 17, 2001

(65) Prior Publication Data

US 2002/0018874 A1 Feb. 14, 2002

(30) Foreign Application Priority Data

May 17, 2000 (JP) ........................................ 2000-145775

(51) Int. Cl.[7] ............................... B41J 2/35; B41C 1/14; B41C 1/05
(52) U.S. Cl. ................. 101/128.4; 347/192; 400/120.14
(58) Field of Search ......................... 101/128.21, 128.4, 101/127; 400/120.09, 120.12, 120.13, 120.14; 347/188, 192, 193, 196, 191

(56) References Cited

U.S. PATENT DOCUMENTS

| 5,384,585 | A | * | 1/1995 | Okumura | ................. | 101/128.4 |
| 5,514,462 | A | | 5/1996 | Endo et al. | ............. | 101/128.21 |
| 5,592,209 | A | * | 1/1997 | Hasegawa et al. | ........... | 347/206 |
| 5,809,879 | A | * | 9/1998 | Yokoyama et al. | ...... | 101/128.4 |
| 6,130,697 | A | | 10/2000 | Yokoyama et al. | ...... | 101/128.4 |
| 6,357,348 | B1 | * | 3/2002 | Nakamura et al. | ....... | 101/128.4 |

FOREIGN PATENT DOCUMENTS

| EP | 0 992 351 | | 4/2000 |
| JP | 04-125190 A | | 4/1992 |
| JP | 4-363286 | * | 12/1992 |
| JP | 05-278251 | | 10/1993 |
| JP | 05-345403 | | 12/1993 |
| JP | 07-068964 A | | 3/1995 |
| JP | 08-332786 | | 12/1996 |
| JP | 10-217422 | | 8/1998 |
| JP | 10-272688 | | 10/1998 |
| JP | 2000-079672 | | 3/2000 |
| JP | 2000-108296 | | 4/2000 |

* cited by examiner

Primary Examiner—Stephen R. Funk
(74) Attorney, Agent, or Firm—Nixon Peabody LLP; Donald R. Studebaker

(57) ABSTRACT

When thermally perforating a thermoplastic resin film of heat-sensitive stencil material by the use of a thermal head, supply of energy to the thermal head is cut at a time the diameter of the perforations becomes not smaller than 65% and not larger than 95% of a target diameter of the perforations.

6 Claims, 8 Drawing Sheets

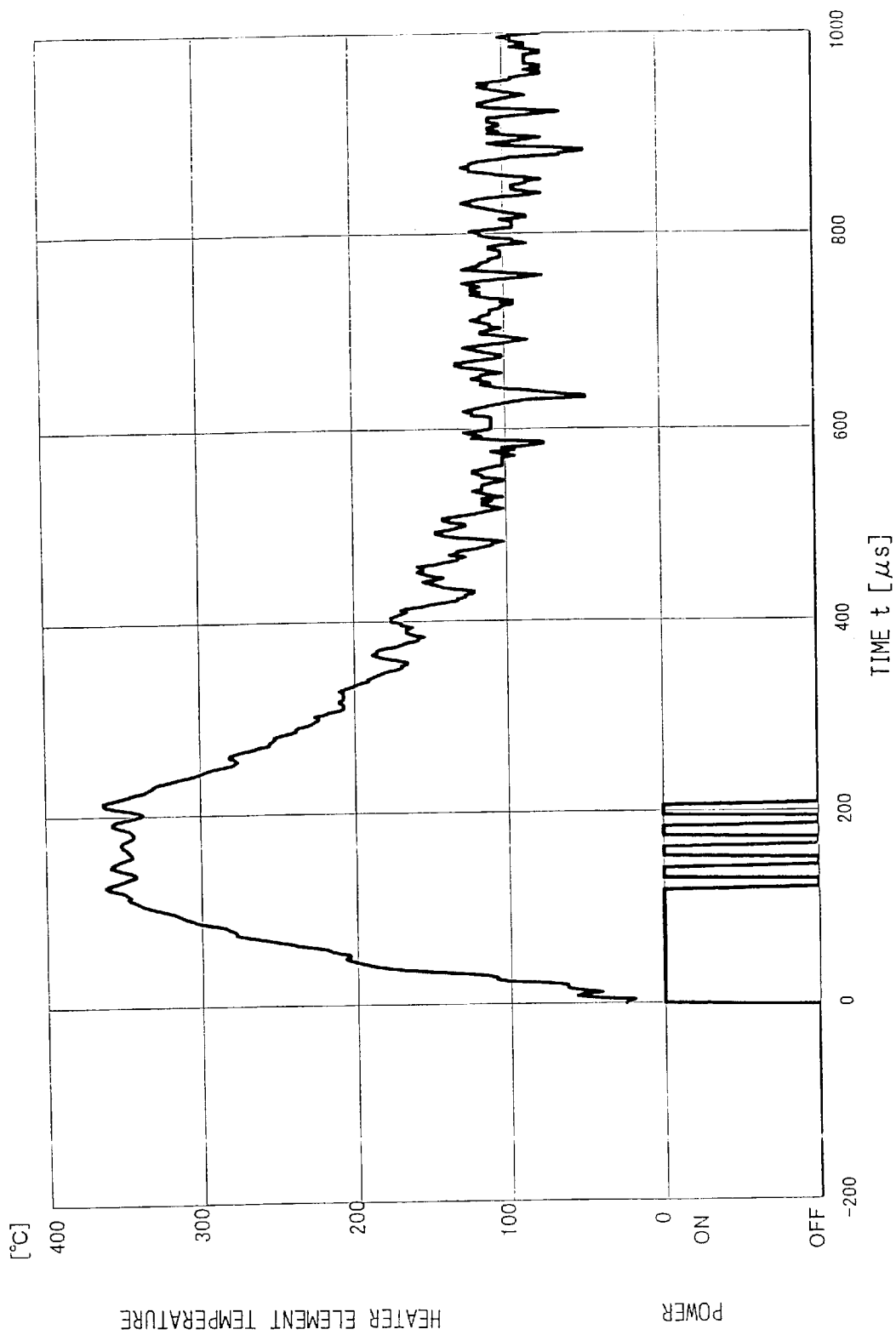

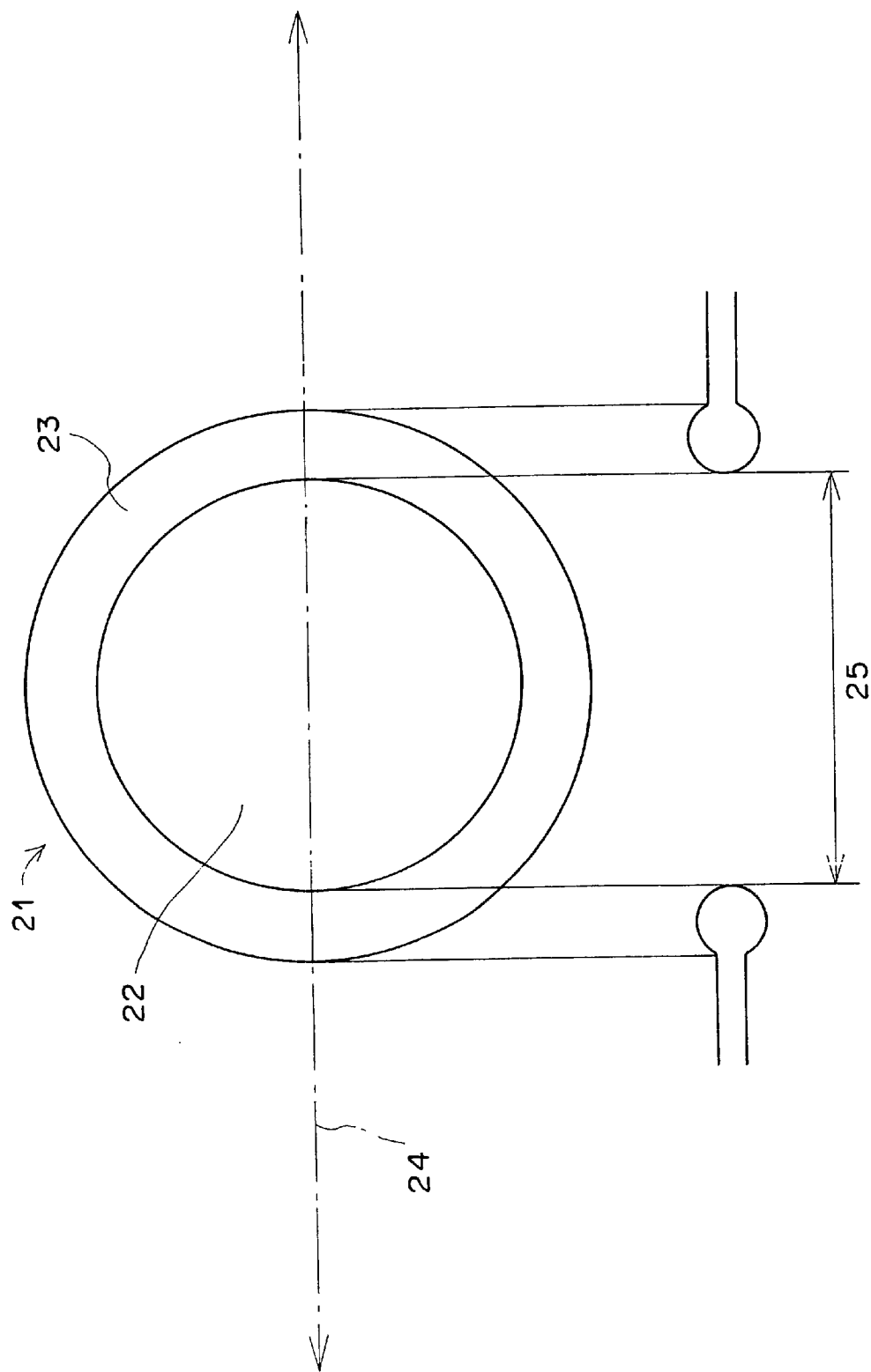

METHOD OF AND APPARATUS FOR MAKING HEAT-SENSITIVE STENCIL AND HEAT-SENSITIVE STENCIL MATERIAL

BACKGROUND OF THE INVENTION

1. Field of the Invention

This invention relates to a method of and an apparatus for making a stencil by thermally perforating a thermoplastic resin film of heat-sensitive stencil material by a thermal head or the like, and to a heat-sensitive stencil material. More particularly, this invention relates to improvement in shape of perforations, printing quality and stencil making speed.

2. Description of the Related Art

Methods of making a heat-sensitive stencil are broadly divided into a method in which the resin film side of the heat-sensitive stencil material is brought into close contact with an original bearing thereon an image depicted in a carbon-containing material and the resin film is perforated by heat generated by the image upon exposure to infra-red rays and a method in which the resin film of the heat-sensitive stencil material is imagewise perforated by two-dimensionally scanning the resin film side of the heat-sensitive stencil material with a device such as a thermal head having an array of micro heater elements. The former method will be referred to as "an analog stencil making method" and the latter method will be referred to as "a digital stencil making method", in this specification. At the present, the digital stencil making method is prevailing over the analog stencil making method since the former does not require carbon in the original and permits easy image processing.

When the stencil is made by the digital stencil making method, it is preferred that the perforations be discrete by pixel, and be uniform in shape and degree of penetration so that the thin lines and/or edges of the printings show rims faithful to the original, the solid portions of the printings has a sufficient density and the amount of ink to be transferred to each printing sheet can be well controlled not to cause offset (the phenomenon the ink on the surface of a first printed sheet stains the back side of a second printed sheet superposed on the surface of the first printed sheet).

On the other hand, in order to meet the recent demand for higher image quality, highly fine or high resolution thermal heads such as of 400 dpi or 600 dpi have been in wide use as the thermal device for thermally perforating the stencil material. Such high resolution thermal devices are generally lower than low resolution thermal devices in the maximum temperature they can provide. Accordingly, in order to perforate the stencil material in a given size with the high resolution thermal device, the stencil material should be more sensitive to perforation than when it is perforated by the low resolution thermal device. Further, since the number of perforations (pixels) increases as the resolution increases, it is preferred that the time required to form each perforation be shortened, that is, each perforation be formed at a higher speed. Thus, physical properties of the resin film, the structure of the thermal head, and the method of controlling the thermal head for meeting these demands have been searched for.

The thermoplastic resin film for the heat-sensitive stencil material produces shrinkage stress and is perforated by shrinkage. In order to improve sensitivity to perforation of the heat-sensitive stencil material, there has been proposed thermoplastic resin film having a specified heat shrinkage factor disclosed, for instance, in Japanese Unexamined Patent Publication No. 4(1992)-125190 or thermoplastic resin film having a specified heat shrinkage factor and a specified heat shrinkage stress disclosed, for instance, in Japanese Unexamined Patent Publication Nos. 7(1995)-52573 and 7(1995)-68964. However, in these patent publications, the heat shrinkage factor or the heat shrinkage stress is specified on the basis of measurement of the heat shrinkage factor or the heat shrinkage stress when the film is heated several to several tens of minutes, which is very long as compared with the time for which the film is heated in the actual perforation. Further, the measurement is static and does not reflect the actual perforation. Further, though the heat shrinkage factor or the heat shrinkage stress measured by, for instance, TMA (thermo-mechanical analysis) under a macroscopic and quasi-static condition where the area to be heated is not smaller than several millimeters (mm) and the temperature change is 10° C./min or so has been reported, the behavior of the perforations under a microscopic and dynamic condition in the actual stencil making process where the area to be heated by the thermal head or the like is several tens of micrometers ($\mu$m) and the temperature change is 1° C./$\mu$s or so has not been reported. Thus the reported heat shrinkage factor or heat shrinkage stress does not conform to the actual perforation.

Further, conventionally, discussion on the perforation in the stencil making process has been made not on the basis of behavior of perforations in course of perforation but on the final state of perforations. In such discussion, physical properties of the resin film and the structure of the thermal head, and the method of controlling the thermal head are generally discussed in order to control the final size and shape of the perforations and the TMA data on the film is employed only to indicate the sensitivity to perforation. Accordingly, the properties of the film concerning to the degree to which the perforations are discrete by pixel and the shape of the perforations is stabilized are generally incompatible with the sensitivity to perforation of film and the speed at which the film is perforated. That is, when a film can be perforated so that the perforations are well discrete and uniform in shape, the film is less sensitive to the perforation and takes a long time to perforate. Naturally the opposition is also true. Accordingly, in the actual design of a stencil making system, a plurality of kinds of thermoplastic resin film are prepared, the sensitivity to perforation of each kind of film is determined by repeating experiments or TMA measurements, and one of the kinds of film which is most close to a target sensitivity is selected.

The general data on the heat shrinkage factor and heat shrinkage stress do not always conform to the evaluation of film obtained in the actual design of a stencil making system with respect to, for instance, discreteness and uniformity of shape of the perforations, the sensitivity to perforation and the perforating speed. As described above, this is because the TMA data and the like are obtained under a macroscopic and quasi-static condition whereas the actual perforation in the actual stencil making process is effected under a microscopic and dynamic condition. Further, it is difficult to read from the TMA data the performance of the film representing the perforating speed, the stability of the shape of perforations and the like except the sensitivity to perforation. Even about the sensitivity to perforation, it is difficult to estimate the difference in the sensitivity to perforation between film samples which are slightly different from each other, for instance, in TMA curves since actually impossible to prepare a variety of film samples which are different from each other in one or more particular factor such as the TMA curve with the other factors held to be the same. Accordingly, when a suitable kind of resin film is to be selected, stencils must be actually made using a variety of resin film samples, which adds to the development cost.

As described above, information obtained as a characteristic value in the stencil making experiments is only on the size and shape of the perforations at the time the perforations are completed. Accordingly, it has been very difficult to know, without experience and sense, how the physical properties of the resin film should be changed on the basis of the result of experiment in order to obtain a desirable form of perforation, which has been made difficult development of new products and improvement of the performance of the products. Unsatisfactory design of the performance of the resin film can result in the case where the sensitivity to perforation and perforating speed are too poor to obtain a high-resolution stencil under a practical condition though the perforations are discrete and substantially uniform in shape or in the case where the perforations are not discrete and not uniform in shape though the sensitivity to perforation and perforating speed are satisfactory.

Thus, it has been impossible to develop, on the basis of conventional data experimentally obtained, a method of and an apparatus for making a stencil by thermally perforating a thermoplastic resin film of heat-sensitive stencil material, and a thermoplastic resin film for heat-sensitive stencil material in which demands for uniformity in shape of perforations, sensitivity to perforation and perforating speed are all satisfied.

SUMMARY OF THE INVENTION

In view of the foregoing observations and description, the primary object of the present invention is to provide a method of and an apparatus for making a stencil by thermally perforating a thermoplastic resin film of heat-sensitive stencil material, and a thermoplastic resin film for heat-sensitive stencil material in which perforations can be discrete and uniform in shape, and sensitivity to perforation and perforating speed are high.

In accordance with a first aspect of the present invention, there is provided a method of making a stencil by thermally forming perforations arranged in both a main scanning direction and a sub-scanning direction in a thermoplastic resin film of heat-sensitive stencil material by the use of a heat source which is heated through supply of energy, wherein the improvement comprises that supply of energy to the heat source is cut at a time the diameter of the perforations becomes not smaller than 65% and not larger than 95% of a target diameter of the perforations.

It is preferred that the target diameters of the perforations in the main scanning direction and the sub-scanning direction be set not smaller than 45% and not larger than 80% of the scanning pitches in the respective directions.

In accordance with a second aspect of the present invention, there is provided a method of making a stencil by thermally forming perforations arranged in both a main scanning direction and a sub-scanning direction in a thermoplastic resin film of heat-sensitive stencil material by the use of a heat source which is heated through supply of energy, wherein the improvement comprises that supply of energy to the heat source is cut at a time the area of the perforations becomes not smaller than 42% and not larger than 90% of a target area of the perforations.

It is preferred that the target area of the perforations be set not smaller than 20% and not larger than 50% of the product of the scanning pitches in the main scanning direction and in the sub-scanning direction.

In accordance with a third aspect of the present invention, there is provided an apparatus for making a stencil comprising a heat source which is heated through supply of energy, a heat source control means which supplies energy to the heat source and a scanning means which scans a thermoplastic resin film of heat-sensitive stencil material with the heat source to thermally form perforations arranged in both a main scanning direction and a sub-scanning direction in the thermoplastic resin film, wherein the improvement comprises that the heat source control means cuts supply of energy to the heat source at a time the diameter of the perforations becomes not smaller than 65% and not larger than 95% of a target diameter of the perforations.

It is preferred that the heat source control means sets the target diameters of the perforations in the main scanning direction and the sub-scanning direction to be not smaller than 45% and not larger than 80% of the scanning pitches in the respective directions.

In accordance with a fourth aspect of the present invention, there is provided an apparatus for making a stencil comprising a heat source which is heated through supply of energy, a heat source control means which supplies energy to the heat source and a scanning means which scans a thermoplastic resin film of heat-sensitive stencil material with the heat source to thermally form perforations arranged in both a main scanning direction and a sub-scanning direction in the thermoplastic resin film, wherein the improvement comprises that the heat source control means cuts supply of energy to the heat source at a time the area of the perforations becomes not smaller than 42% and not larger than 90% of a target area of the perforations.

It is preferred that the heat source control means sets the target area of the perforations to be not smaller than 20% and not larger than 50% of the product of the scanning pitches in the main scanning and sub-scanning directions.

In accordance with a fifth aspect of the present invention, there is provided a thermoplastic resin film for stencil material which is scanned by a heat source, which is heated through supply of energy, in both a main scanning direction and a sub-scanning direction and is thermally formed with perforations arranged in the main scanning and sub-scanning directions in the thermoplastic resin film, wherein the improvement comprises that the heat shrinkable properties of the thermoplastic resin film are such that the diameter of the perforations is enlarged after cutting supply of energy to the heat source to from 105% to 154% of that at the time the supply of energy to the heat source is cut.

In accordance with a sixth aspect of the present invention, there is provided a thermoplastic resin film for stencil material which is scanned by a heat source, which is heated through supply of energy, in both a main scanning direction and a sub-scanning direction and is thermally formed with perforations arranged in the main scanning and sub-scanning directions in the thermoplastic resin film, wherein the improvement comprises that the heat shrinkable properties of the thermoplastic resin film are such that the area of the perforations is enlarged after cutting supply of energy to the heat source to from 110% to 237% of that at the time the supply of energy to the heat source is cut.

With reference to FIG. 5, "the diameter of the perforations" is defined as follows. That is, in a perforation 21, the diameter of the perforation 21 in a given direction is a length 25 of an orthographic projection of the inner periphery (a boundary defined by a dark region of the inner slope of the rim to be described later in a reflective bright-field image obtained though an optical microscope) of the rim 23 (an annular thickened part generated by thermal perforation) of the perforation 21 onto a straight line 24 parallel to the given direction.

The "area of the perforation" is the area of the part 22 (FIG. 5) circumscribed by the inner periphery of the rim.

These inventors have found a method of evaluating perforation from a novel point of view. That is, we observed the phenomenon that a small perforation was formed and enlarged with time when the thermoplastic resin film of the stencil material was brought into contact with the heat source such as a thermal head by the use of a system which could take an image in a microscopic field of view of the order of $\mu m$ at a high speed of $\mu s$. The result is shown in FIG. 6. In FIG. 6, the ordinate represents the diameter of the perforation and the abscissa represents the time from the time supply of energy to the heat source is initiated. From FIG. 6, we have found that perforation occurs in the following four stages.

In the first stage, the thermoplastic resin film is heated by a heater element (heat source) of a thermal head the temperature of which is the highest at the center thereof and is lowered toward its periphery. The temperature of the film is the highest at a part in contact with the center of the heater element and as the distance from the part in contact with the center of the heater element increases, the temperature of the film lowers. When the temperature of the film exceeds a shrinkage initiation temperature at which the film starts to shrink, shrinkage stress, which tends to reduce the distance between any two points on the film, is generated and accordingly, tension is produced in any point of areas which are not lower than the shrinkage initiation temperature. The direction of the tension is substantially perpendicular to (just perpendicular to if thermal shrinkage is isotropic) isothermal lines on the film. On the other hand, where the temperature of the film is sufficiently low, no shrinkage stress is generated. Accordingly, resin of the film is moved away from the highest temperature point of the film as if it slides down the temperature gradient.

In the second stage, an initial small perforation is generated near the highest temperature point of the film.

In the third stage, the outer periphery of the initial small perforation is pulled outward by tension from outside, whereby the perforation is enlarged (growth of the perforation by shrinkage stress). The outer periphery of the perforation is pulled outward and increases its volume taking in resin on its path, whereby the rim is formed.

In the fourth stage, the heater element is de-energized and its temperature lowers. As the temperature of the heater element lowers, the temperature of the film in contact with the heater element lowers, and when the temperature of the film becomes lower than the shrinkage initiation temperature, no tension acts on the rim and the shape of the perforation is fixed (end of the perforation). The diameter or the area of the perforation as measured in this stage will be referred to as the diameter or the area of the perforation "in the final state", hereinbelow.

Thus we have found that the aforesaid incompatible requirements, that is, discreteness of the perforations, stability in shape of the perforations, sensitivity to perforation of the stencil material and high speed perforation, can be balanced at a high level by setting in a certain range the ratio of the size of the perforation at the time supply of energy to the heat source is cut to the target size of the perforation out of the various parameters obtained from the perforation size versus energizing time curve.

That is, in terms of the diameter of the perforation, the aforesaid incompatible requirements can be balanced at a high level by cutting supply of energy to the heat source at a time the diameter of the perforation becomes not smaller than 65% and not larger than 95% of a target diameter of the perforation. When supply of energy to the heat source is cut before the diameter of the perforation becomes not smaller than 65% of the target diameter of the perforation, sensitivity to perforation deteriorates and the perforations cannot be formed at a satisfactory speed. Whereas, when supply of energy to the heat source is cut after the diameter of the perforation becomes larger than 95% of the target diameter of the perforation, the perforations cannot be discrete and at the same time the shape of the perforations becomes unstable.

Further, when the target diameters of the perforation in the main scanning direction and the sub-scanning direction, that is, the diameters in the main scanning direction and the sub-scanning direction to which the perforation is expected to be enlarged after cut of the energy supply, are set not smaller than 45% and not larger than 80% of the scanning pitches in the respective directions, the amount of ink transferred through the stencil obtained can be such that offset can be avoided in solid parts while necessary density is ensured, and thin character parts can be sufficient in width and density.

In terms of the area of the perforation, the aforesaid incompatible requirements can be balanced at a high level by cutting supply of energy to the heat source at a time the area of the perforation becomes not smaller than 42% and not larger than 90% of a target diameter of the perforation. When supply of energy to the heat source is cut before the area of the perforation becomes not smaller than 42% of the target area of the perforation, sensitivity to perforation deteriorates and the perforations cannot be formed at a satisfactory speed. Whereas, when supply of energy to the heat source is cut after the area of the perforation becomes larger than 92% of the target area of the perforation, the perforations cannot be discrete and at the same time the shape of the perforations becomes unstable.

Further, when the target area of the perforation, that is, the area to which the perforation is expected to be enlarged after cut of the energy supply, is set to be not smaller than 20% and not larger than 50% of the product of the scanning pitches in the main scanning and sub-scanning directions, the amount of ink transferred through the stencil obtained can be such that off set can be avoided in solid parts while necessary density is ensured, and thin character parts can be sufficient in width and density.

When the heat shrinkable properties of the thermoplastic resin film for the stencil material are such that the diameter of the perforation is enlarged after cutting supply of energy to the heat source to from 105% to 154% of that at the time the supply of energy to the heat source is cut, the perforations can be discrete, the shape of the perforations can be stabilized, an excellent sensitivity to perforation can be ensured and a high perforating speed can be ensured.

If the diameter of the perforation is not enlarged after cutting supply of energy to the heat source to 105% of that at the time the supply of energy to the heat source is cut, sensitivity to perforation deteriorates and the perforations cannot be formed at a satisfactory speed. Whereas if the diameter of the perforation is enlarged after cutting supply of energy to the heat source larger than 105% of that at the time the supply of energy to the heat source is cut, the shape of the perforations is apt to fluctuate though sensitivity to perforation is improved and the perforating speed is increased.

When the heat shrinkable properties of the thermoplastic resin film for the stencil material are such that the area of the perforation is enlarged after cutting supply of energy to the heat source to from 110% to 237% of that at the time the supply of energy to the heat source is cut, the perforations can be discrete, the shape of the perforations can be stabilized, an excellent sensitivity to perforation can be ensured and a high perforating speed can be ensured.

If the area of the perforation is not enlarged after cutting supply of energy to the heat source to 110% of that at the time the supply of energy to the heat source is cut, sensitivity to perforation deteriorates and the perforations cannot be formed at a satisfactory speed. Whereas if the area of the perforation is enlarged after cutting supply of energy to the heat source larger than 237% of that at the time the supply of energy to the heat source is cut, the shape of the perforations is apt to fluctuate though sensitivity to perforation is improved and the perforating speed is increased.

The values of the diameter and the area of the perforations are not as measured in the thermoplastic film laminated on the porous support sheet (to form a heat-sensitive stencil) but as measured in the thermoplastic film by itself. This is because it is very difficult to observe the state of perforation and to measure the diameter and/or the area of the perforation in a state where the thermoplastic film is laminated on the porous support sheet. However, the state of perforation (the diameter and/or the area of the perforation) as measured in the thermoplastic film by itself has a high correlation with that as measured in the thermoplastic film laminated on the porous support sheet. FIGS. 7 and 8 show the correlation. In FIG. 7, the ordinate represents the diameters of the perforations in the final state when a heat-sensitive stencil material (a thermoplastic film and a porous support sheet laminated together) is perforated under various conditions and the abscissa represents the diameters of the perforations in the final state when the same thermoplastic film as that employed in the heat-sensitive stencil material is perforated by itself under the same conditions. The correlation coefficient of the graph shown in FIG. 7 is 0.913. In FIG. 8, the ordinate represents the areas of the perforations in the final state when a heat-sensitive stencil material (a thermoplastic film and a porous support sheet laminated together) is perforated under various conditions and the abscissa represents the areas of the perforations in the final state when the same thermoplastic film as that employed in the heat-sensitive stencil material is perforated by itself under the same conditions. The correlation coefficient of the graph shown in FIG. 8 is 0.9319. Thus it will be understood that the state of perforation in the thermoplastic film by itself can represent the state of perforation in the heat-sensitive stencil material comprising the thermoplastic film laminated with a porous support sheet.

BRIEF DESCRIPTION OF THE DRAWINGS

FIG. 3 is a view showing the relation between the temperature of the heater element and the intermittent pulse applied to the heater element, FIG. 5 is a schematic view showing a perforation.

DESCRIPTION OF THE PREFERRED EMBODIMENT

Figure 1:
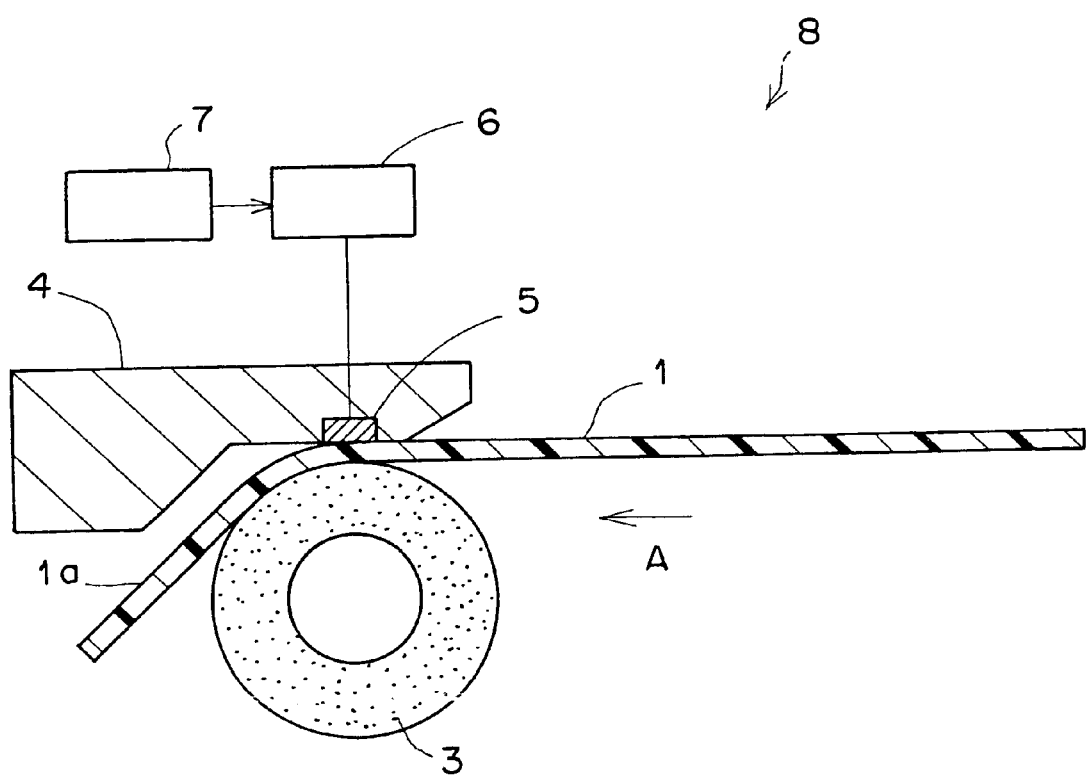
FIG. 1 is a schematic view showing a heat-sensitive stencil making apparatus in accordance with an embodiment of the present invention.

In FIG. 1, a stencil making apparatus 8 in accordance with an embodiment of the present invention comprises a thermal head 4 having an array of a plurality of heater elements 5 (only one is visible in FIG. 1), and a platen roller 3. A heat-sensitive stencil material 1 is conveyed in the direction of arrow A when the platen roller 3 is driven by an electric motor (not shown) and passed between the platen roller 3 and the thermal head 4 with the side of a thermoplastic film 1a of the stencil material 1 facing the thermal head 4. Thus the heater elements 5 of the thermal head 4 are pressed against the thermoplastic film 1a of the stencil material 1 and the thermoplastic film 1a is perforated by the heater elements 5 energized by a head drive circuit 6. The energy supplied to the heater elements by the head drive circuit 6 is controlled by a controller 7. In order to increase the perforating speed, the heater elements 5 are divided into a plurality of blocks, and the head drive circuit 6 drives the heater elements 5 block by block.

Figure 2:
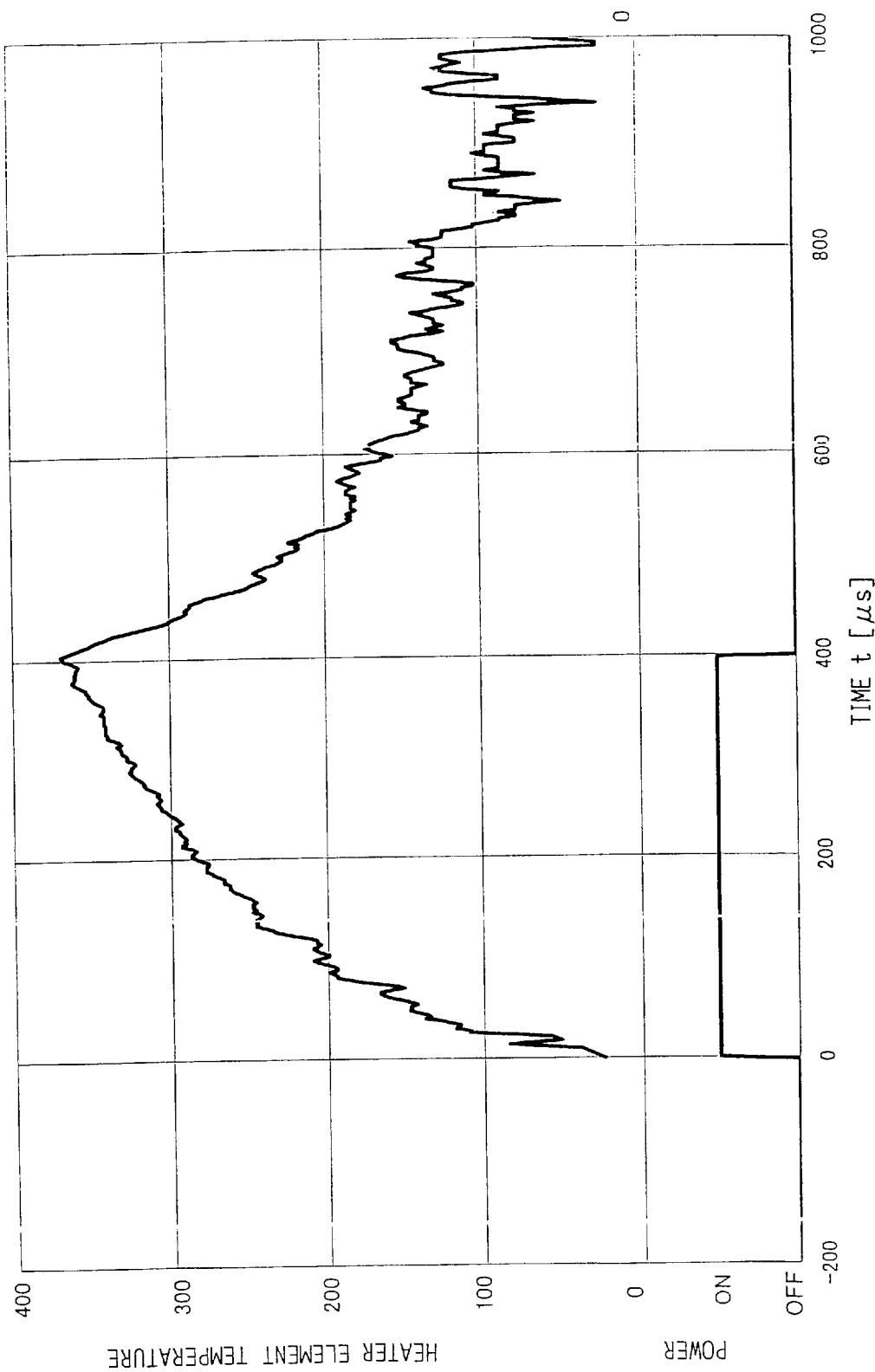
FIG. 2 is a view showing the relation between the temperature of the heater element and the square pulse applied to the heater element.

In this stencil making apparatus 8, power (voltage) in the form of a continuous square wave is supplied to the heater element 5 to perforate a perforation corresponding to one pixel as shown in FIG. 2. Integration of supplied power with time is supplied energy. While power is being supplied, the temperature of the surface of the heater element 5 increases and when power supply is cut, the temperature of the surface of the heater element 5 comes to lower. FIG. 2 is an example of change in the temperature of the surface of the heater element 5 at its center as measured by an infrared radiation thermometer. When the heater element 5 is heated in the pattern shown in FIG. 2, the part of the thermoplastic resin film of the stencil material is perforated through heat shrinkage. The heater element 5 may be supplied with power of intermittent waveform as shown in FIG. 3. In the case where the heater element 5 is supplied with power of intermittent waveform, the time the last pulse is terminated is considered to be the time supply of energy to the heater element 5 is cut. The waveform of power supplied to the heater element 5 need not be limited to a square wave having constant power, but may be, for instance, an analog waveform.

Figure 4A:
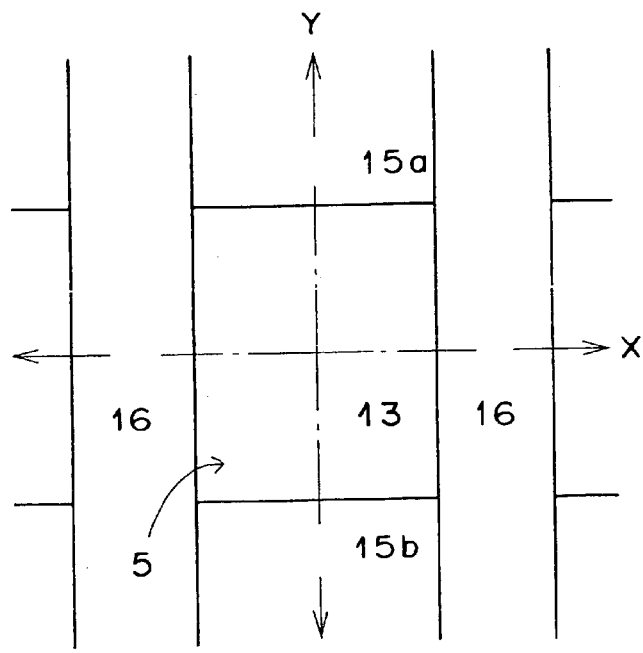
FIG. 4A is a fragmentary plan view showing an important part of the thermal head.
Figure 4B:
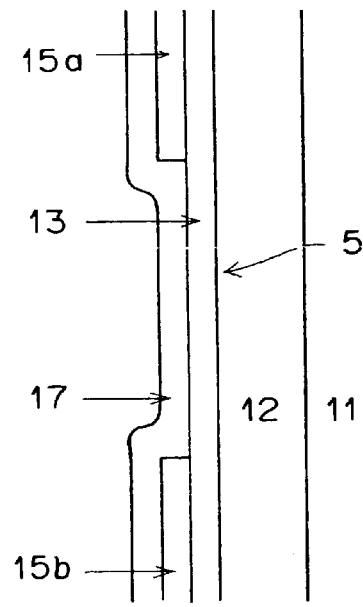
FIG. 4B is a cross-sectional view taken along line Y—Y in FIG. 4A.
Figure 4C:
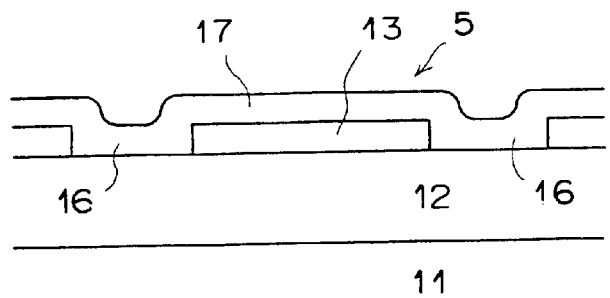
FIG. 4C is a cross-sectional view taken along line X–X in FIG. 4A.
Figure 6:
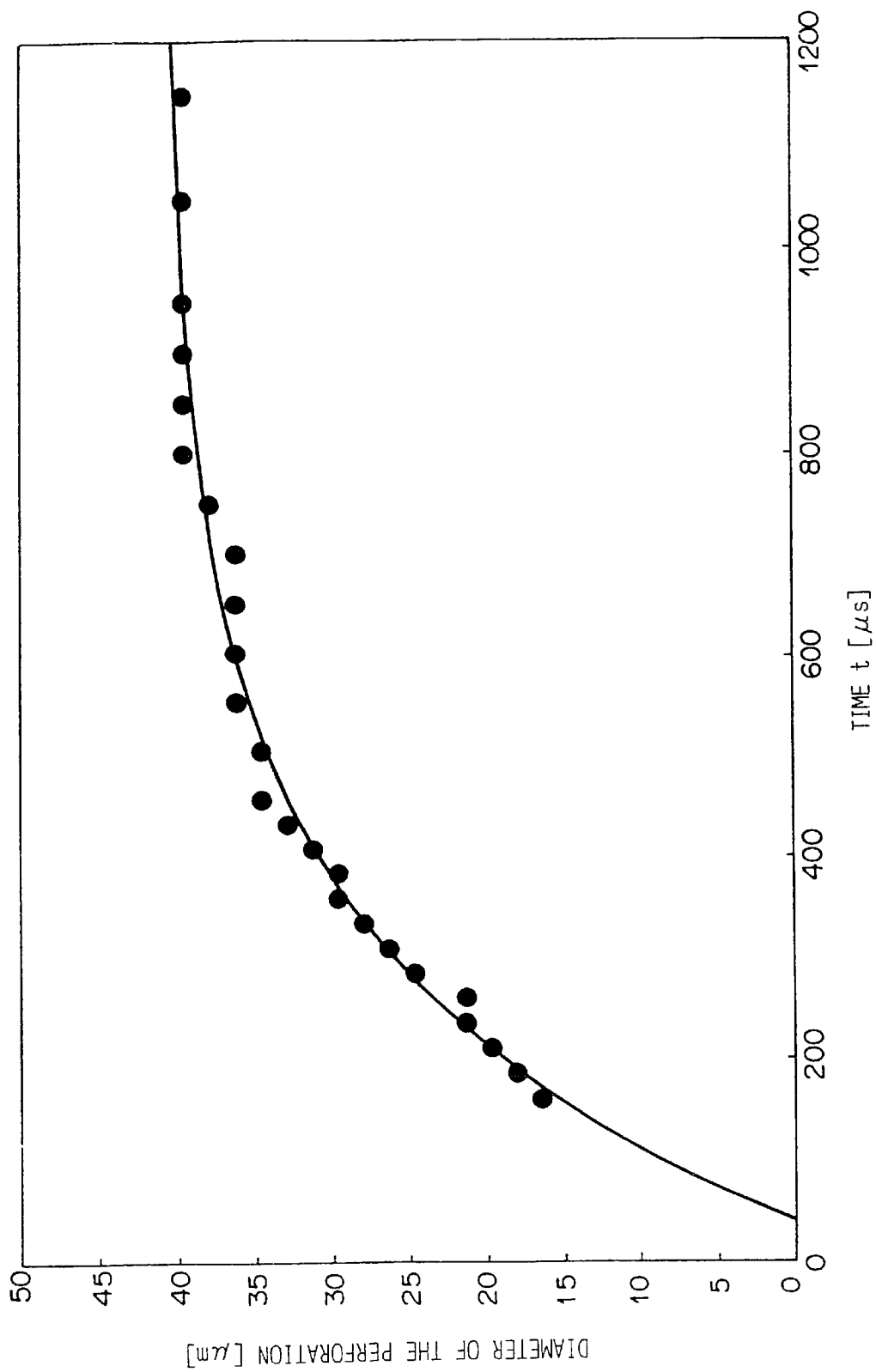
FIG. 6 is a graph showing change in diameter of the perforation during formation thereof.
Figure 7:
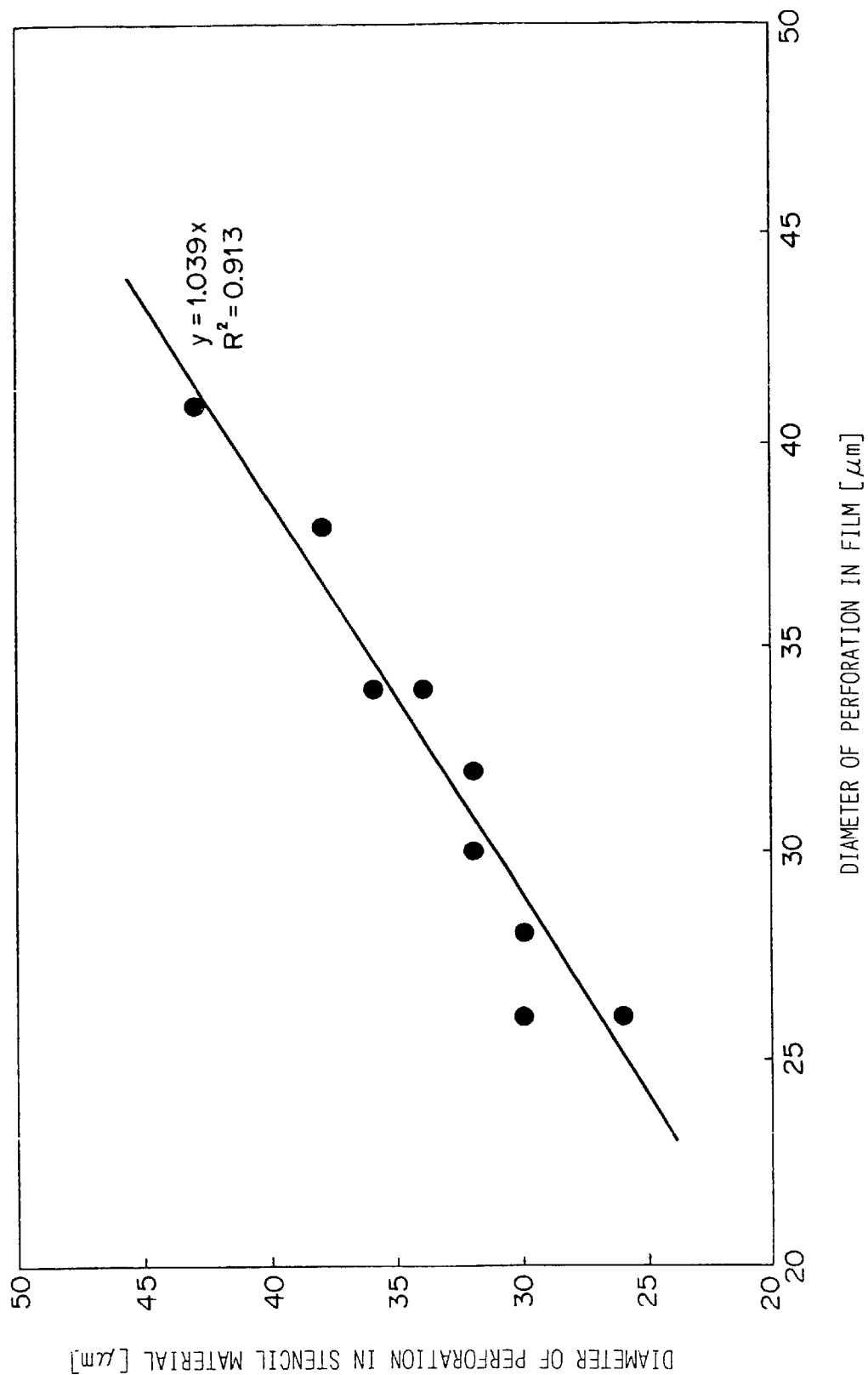
FIG. 7 is a graph showing the correlation between the diameter of the perforation as measured in the thermoplastic film by itself with that as measured in the thermoplastic film laminated on the porous support sheet.
Figure 8:
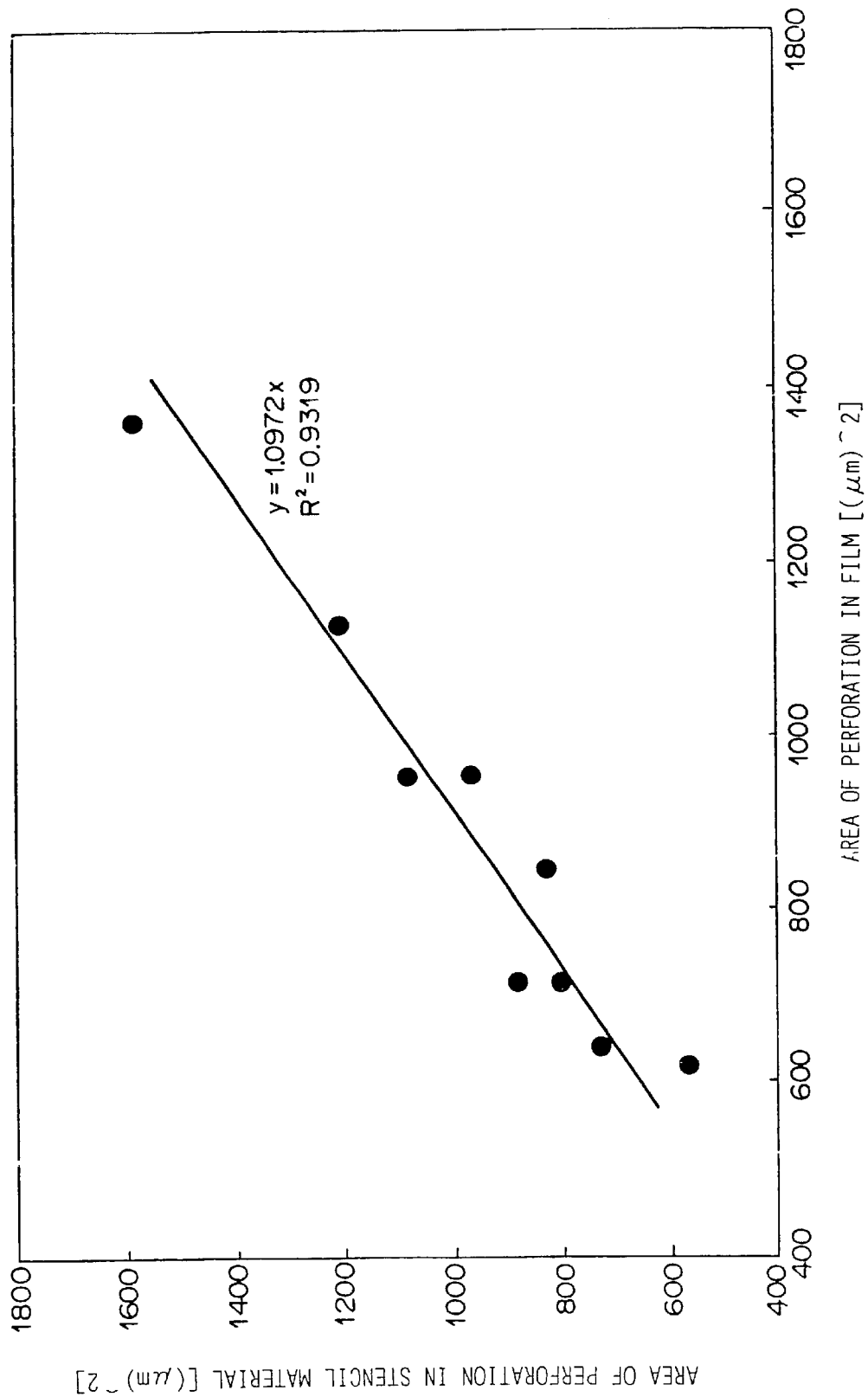
FIG. 8 is a graph showing the correlation between the area of the perforation as measured in the thermoplastic film by itself with that as measured in the thermoplastic film laminated on the porous support sheet.

As shown in FIGS. 4A to 4C, the thermal head 4 is of a standard structure of a full glaze thin film type thermal head in this particular embodiment, though need not be limited to such a structure. For example, a partial glaze thin film type thermal head or a thick film type thermal head may be employed. In FIGS. 4A to 4C, the thermal head 4 comprises an insulating substrate 11 (e.g., of ceramic) and a glaze layer 12 formed on a metal heat radiator (not shown) in this order. Further, a plurality of resistor strips 13, each extending in a sub-scanning direction shown by arrow Y, are formed on the glaze layer 12 arranged in a main scanning direction shown by arrow X electrically spaced from each other by separating belts 16. Further, a common electrode 15a and a discrete electrode 15b are formed over each resistor strip 13 opposed to each other and spaced from each other in the sub-scanning direction. When an electric voltage is applied between the common electrode 15a and the discrete electrode 15b, an electric current flows through the resistor strip 13 between the common electrode 15a and the discrete electrode 15b and the resistor strip 13 generates Joule heat. That is, the part of the resistor strip 13 between the common electrode 15a and the discrete electrode 15b forms a heater element 5. The surface of the thermal head 4 is covered with a protecting layer 17 and the heater element 5 (resistor strip 13) is brought into contact with the thermoplastic film 1a of the stencil material 1 with the protecting layer 17 intervening therebetween. The stencil material 1 is two-dimensionally scanned by the heater element 5 by moving the thermal head 4, having a heater element array extending in the main scanning direction, with respect to the stencil material 1 in the sub-scanning direction.

It is preferred that the heat shrinkable properties of the thermoplastic resin film 1a of the stencil material 1 be such that the diameter of the perforations is enlarged after cutting supply of energy to the heater element 5 to from 105% to 154%, preferably from 109% to 140%, and more preferably from 112% to 133%, of that at the time the supply of energy to the heater element 5 is cut. In terms of the area of the perforation, it is preferred that the heat shrinkable properties of the thermoplastic resin film 1a of the stencil material 1 be such that the area of the perforations is enlarged after cutting supply of energy to the heater element 5 to from 110% to 237%, preferably from 119% to 196%, and more preferably from 125% to 177%, of that at the time the supply of energy to the heater element 5 is cut. When these conditions are met, the perforations can be discrete and stabilized in shape, the sensitivity to perforation is improved and the perforating speed can be increased.

It is preferred that supply of energy to the heater element 5 be cut at a time the diameter of the perforations becomes not smaller than 65% and not larger than 95%, preferably, not smaller than 72% and not larger than 92%, and more preferably, not smaller than 75% and not larger than 90%, of a target diameter of the perforations. In terms of area of the perforation, it is preferred that supply of energy to the heater element 5 be cut at a time the area of the perforations becomes not smaller than 42% and not larger than 90%, preferably, not smaller than 49% and not larger than 85%, and more preferably, not smaller than 56% and not larger than 81%, of a target diameter of the perforations. The controller 7 controls the head drive circuit 6 so that power supply to the heater element 5 is cut in the manner described above.

As the thermoplastic resin film 1a of the heat-sensitive stencil material 1, polyester series resins such as polyethylene terephthalate, polyolefin series resins such as polyethylene, polypropylene, polystyrene, and the like, halogenated polymers such as polyvinylidene chloride, polyvinylidene fluoride, and the like, vinyl polymer such as polyvinyl alcohol, and polyamide series resins may be employed. Among those, polyester series resin is especially preferred.

"Polyester series resins" include all the polymers obtained by polycondensation of aromatic dicarboxylic acids, aliphatic dicarboxylic acids, or alicyclic dicarboxylic acids and diols or hydroxycarboxylic acids.

As the acid component, terephthalic acid, isophthalic acid, 2,6-naphthalenedicarboxylic acid, adipic acid, sebacic acid, succinic acid, 1,4-cyclohexanedicarboxylic acid, and the like may be used. One or more of these acids may be used. Further, a part of the oxy-acid of hydroxybenzoic acid may be copolymerized.

As the diol component, ethylene glycol, 1,4-butanediol, 1,6-hexanediol, 1,4-cyclohexanedimethanol and the like are preferred. One or more of these diols may be used. Further, various combinations of lactic acids and hydroxycarboxylic acids can be employed.

As the polyester for the polyester film, polyethylene terephthalate, copolymer of ethylene terephthalate and ethylene isophthalate, polybutylene terephthalate, a blend of polyethylene terephthalate and polybutylene terephthalate, polyethylene-2,6-naphthalate, polyhexamethylene terephthalate, copolymer of hexamethylene terephthalate and 1,4-cyclohexanedimethylene, L-lactic acids, D-lactic acids and the like are preferably employed.

It is preferred that the thermoplastic resin film 1a is biaxially oriented. The biaxially oriented thermoplastic resin film may be oriented in any method including inflation biaxial co-orientation method, tenter biaxial co-orientation method and tenter biaxial sequence orientation method.

For example, the biaxially oriented thermoplastic resin film may be obtained by preparing un-oriented film by extruding a polymer on a cast drum by T-die extrusion, orienting the un-oriented film in the longitudinal direction by a series of heated rolls, and orienting the longitudinally oriented film in the transverse direction on a tenter or the like as desired. In the case of biaxial sequence orientation, the film is generally oriented in the longitudinal direction first and then oriented in the transverse direction. However, the film may be oriented in the transverse direction first and then oriented in the longitudinal direction. The thickness of the un-oriented film can be controlled by adjusting the slid width of the cap, the amount of the discharged polymer and the rotating speed of the cast drum. The un-oriented film can be oriented at a desired draw ratio by adjusting the rotating speed of the heated rolls and/or the set width of the tenter. Though need not be limited in any direction, the draw ratio is preferably 1.5× to 8×, and more preferably 3× to 8× in both the longitudinal and transverse directions. It is preferred that the orientation temperature be between the glass transition temperature (Tg) of the polyester film and the cold crystallization temperature (Tc).

Though depending upon the sensitivity requirement on the stencil material, the thickness of the thermoplastic resin film is normally 0.1 to 10 µm, preferably 0.1 to 5 µm, and more preferably 0.1 to 3 µm. When the thermoplastic resin film is larger than 10 µm in thickness, the film can become difficult to perforate and when the thermoplastic resin film is smaller than 0.1 µm in thickness, formation of the film sometimes cannot be stabilized.

It is preferred that the thermoplastic resin film 1a has one or more melting points in the range of 150 to 240° C., and more preferably in the range of 160 to 230° C. When the melting point is higher than 240° C., high sensitivity to perforation cannot be obtained, whereas when the melting point is lower than 150° C., the thermal dimensional stability of the film deteriorates and the film curls during manufacture of the stencil or during storage of the stencil, whereby printing image quality becomes unsatisfactory.

The thermoplastic resin film is provided with adequate slip properties by roughening the surface in order to improve workability in the film take-up step during manufacture of the film, the coating step during the stencil making, the laminating step and the printing step. Inorganic particles such as of clay, mica, titanium oxide, calcium carbonate, kaolin, talc, wet or dry silica, alumina, zirconia and the like and organic particles such as those including, as an ingredient, acrylic acids, styrene and the like may be employed to roughen the surface of the resin film. The amount of the particles is preferably 0.05 to 10 parts by weight and more preferably 0.1 to 3 parts by weight per 100 parts by weight of resin. The mean particle size is preferably 0.01 to 3 $\mu$m and more preferably 0.1 to 2 $\mu$m. A plurality of kinds of particles which differ in kind and mean particle size are desirable.

If necessary, the thermoplastic resin film may be added with flame retarder, thermal stabilizer, antioxidant, ultraviolet absorber, antistatic agent, pigment, dye, organic lubricant such as fatty ester and wax, anti-foam agent such as polysiloxane, and the like.

As the porous support sheet, any known porous support sheet may be employed so long as it is permeable to printing ink. For example, silk paper or paper made of synthetic fiber (as a major component) blended with natural fiber, paper made of synthetic fiber, unwoven fabric, fabric, screen gauze and the like may be employed. As the natural fiber, Manila hemp, kozo, mitsumata, pulp and the like are generally employed, and as the synthetic fiber, polyester, vinylon, nylon, rayon and the like are generally employed.

The thermoplastic resin film and the porous support sheet may be laminated in any away so long as they cannot be normally separated from each other and the state of lamination do not interfere with formation of perforations or passage of ink through the stencil. Generally the thermoplastic resin film and the porous support sheet are bonded together by adhesive. However, when the support sheet is of synthetic resin, the film and the support sheet may be thermowelded. As the adhesive, vinyl acetate series adhesives, acrylic series adhesives, vinyl chloride/vinyl acetate copolymer series adhesives, polyester series adhesives, urethane series adhesives and the like may be generally employed. Ultraviolet curing adhesives such as compositions of a photopolymerization initiator with a polyester series acrylate, urethane series acrylate, epoxy series acrylate or polyol series acrylate may also be employed. Among those, adhesive containing therein an urethane series acrylate as a major component is especially preferred. From the viewpoint of sharpness of printings, it is preferred that the thermoplastic resin film and the porous support sheet be bonded together by thermowelding without using adhesive. As the thermowelding, thermocompression bonding where the film and the support sheet are pressed against each other under an elevated temperature is generally employed. The thermocompression bonding may be carried out in any manner. However, it is preferred to use heated rolls in view of easiness in processing. The stencil material may be made by thermowelding a porous support sheet of unwoven fabric of thermoplastic polymer to a thermoplastic resin film during manufacture thereof and orienting the thermoplastic resin film and the support sheet. This process is advantageous in that the resin film is reinforced by the support sheet and is prevented from being broken, whereby the resin film formation is stabilized.

It is preferred that the surface of the thermoplastic resin film be provided with a releasing layer in order to prevent sticking upon perforation. The releasing layer may be formed by coating a releasing agent in any manner. However, it is preferred that the releasing agent be coated by a roll coater, a gravure coater, a reverse roll coater, a bar coater or the like.

As the releasing agent, known releasing agents such as those including silicone oil, silicone series resin, fluorine series resin, surface-active agent can be employed. The releasing agent may be added with various additives including antistatic agent, heat-resistant agent, antioxidant, organic particles, inorganic particles, pigment and the like. Further, in order to improve dispersion in water, the releasing agent coating solution may be added with various additives such as dispersing agent, surface-active agent, preservative, antifoam agent. From the viewpoint of running of the thermal head and/or stain of the thermal head, the thickness of the releasing layer is preferably in the range of 0.01 $\mu$m to 0.4 $\mu$m and more preferably 0.05 $\mu$m to 0.4 $\mu$m.

In order to prove the effect of the present invention, experiment (embodiments 1 to 5 of the present invention and comparative examples 1 and 2) was conducted as follows.

In the experiment, each thermoplastic resin film by itself was perforated and the shape of the perforation was evaluated. Further the same film was bonded to a support sheet to form a heat-sensitive stencil material and a stencil was made by perforating the stencil material. Then the shape of perforations in the stencil was evaluated and printings obtained through the stencil were evaluated. Each thermoplastic resin film by itself was perforated under the condition shown in the following table 1 by pressing the heater element side of the thermal head against the film in a stencil making apparatus which was the same as that shown in FIG. 1 except that it was not provided with the platen roller 3. The experiment was conducted at room temperature.

Specifically, the thermoplastic resin film by itself was perforated in the following manner and the shape of the perforation was evaluated in the following manner.

A fine amount of silicone oil was coated on the surface of heater elements of the thermal head, and thermoplastic resin film was caused to adhere to the surface of the heater elements by way of the silicone oil. In order to make the silicone oil layer between the film and the heater elements as thin as possible, the film was pressed against the elements with a swab to be brought into closer contact with the elements. Then this system was set to an optical microscope. A high-speed video camera was set to the barrel of the microscope by way of an image intensifier. As the high speed video camera, an Ectapro HS motion analyzer 4540 (manufactured by Kodak) was used at a rate of 40,500 frames per second (frame rate ≈24.7 $\mu$s). As the image intensifier, a high-brightness high-speed gate ② unit C6598-40 (available from HAMAMATSU PHOTONICS Co.,) was used with the exposure time set to 10 $\mu$s. The thermal head drive system was set to supply only one pulse to the heater elements. The high-speed video camera was set to start taking a picture in synchronization with start of supply of the pulse to the heater elements. The optical microscope was set so that a reflective bright-field image was observed through the microscope, and the combination of the objective and the barrel lenses were selected so that an overall image of the perforation corresponding to one heater element of the thermal head was taken as large as possible. Accordingly, for a thermal head of a different resolution, a different combination of the objective and the barrel lenses was employed.

When a pulse was applied to the heater element of the thermal head under the conditions described above, the video camera started taking a picture in synchronization with start of supply of the pulse to the heater element. Thereafter, still images of the respective frames were taken in by a personal computer by way of a video capture. By the use of an image analysis software, the diameter of the perforation in the main scanning direction, the diameter of the perforation in the sub-scanning direction, the diameter of the perforation in the direction in which the diameter was maximized were obtained on the basis of a calibrated scale. As the image analysis software, an image analysis package MacSCOPE (Mitsuya Commercial Company) was used.

With reference to FIG. 5, "the diameter of the perforation" is defined as follows. That is, in a perforation 21, the diameter of the perforation 21 in a given direction is a length 25 of an orthographic projection of the inner periphery (a boundary defined by a dark region of the inner slope of the rim in a reflective bright-field image obtained though an optical microscope) of the rim 23 (an annular thickened part generated by thermal perforation) of the perforation 21 onto a straight line 24 parallel to the given direction.

The area of the perforation is obtained by the use of the aforesaid image analysis software on the basis of the aforesaid scale from the images taken in. The "area of the perforation" is the area of the part circumscribed by the inner periphery of the rim and obtained by cutting out the part by edge enhancement and binary-coding and determining the area of the part by image analysis.

Embodiment 1

20 parts by weight of polyethylene terephthalate containing therein 2 wt % of silica 1.0 $\mu$m in mean particle size, 80 parts by weight of ethylene terephthalate-ethylene isophthalate copolymer (copolymerized with 17.5 mol % of isophthalic acid) and 0.1 parts by weight of cerotic acid myristyl were fused, kneaded and extruded with a biaxial extruder and then cut into raw material of copolymer polyester resin (copolymerized with 14 mol % of isophthalic acid; viscosity $\eta$=0.60[Pa·s], Tm=225° C.). Then the raw material was dried under vacuum for 3 hours at 175° C. by the use of a rotary dryer. The raw material was extruded by an extruder 40 mm in screw diameter with the cap of the T-die held at 270° C., and was cast on a cooling drum 300 mm in diameter, whereby un-oriented sheet 13 $\mu$m thick was obtained. Then the un-oriented sheet was oriented to 3.5 times in the longitudinal direction by a series of heated rolls at 90° C., and the longitudinally oriented sheet was further oriented to 3.5 times in the transverse direction by a tenter transverse stretching machine at 95° C. Further, the sheet was subjected to heat treatment at 120° C. for 10 seconds in the tenter, whereby biaxially oriented film 1.0 $\mu$m thick was prepared.

The film by itself was perforated under the conditions shown in the following table 1.

Further the same film was laminated with paper made of polyester fiber 4 $\mu$m in mean fiber diameter (40 wt %) blended with Manila hemp fiber 15 $\mu$m in mean fiber diameter (60 wt %) by polyvinyl acetate resin coated therebetween in an amount of 0.5 g/m$^2$. The paper was 10 g/m$^2$ in weighing and 35 $\mu$m in thickness. Then silicone releasing agent was coated on the surface of the film in an amount of 0.1 g/m$^2$, thereby obtaining a heat-sensitive stencil material.

Further, by the use of the stencil material thus obtained, a stencil was made under the conditions shown in the following table 1 and printing was done by the use of the stencil.

Embodiment 2

10 parts by weight of polyethylene terephthalate containing therein 2 wt % of silica 1.5 $\mu$m in mean particle size, 90 parts by weight of ethylene terephthalate-ethylene isophthalate copolymer (copolymerized with 22.3 mol % of isophthalic acid) and 0.1 parts by weight of cerotic acid myristyl were fused, kneaded and extruded with a biaxial extruder and then cut into raw material of copolymer polyester resin (copolymerized with 20 mol % of isophthalic acid; viscosity $\eta$=0.60 [Pa·s], Tm=220° C.). Then the raw material was dried under vacuum for 3 hours at 175° C. by the use of a rotary dryer. The raw material was extruded by an extruder 40 mm in screw diameter with the cap of the T-die held at 270° C., and was cast on a cooling drum 300 mm in diameter, whereby un-oriented sheet 18 $\mu$m thick was obtained. Then the un-oriented sheet was oriented to 3.5 times in the longitudinal direction by a series of heated rolls at 85° C., and the longitudinally oriented sheet was further oriented to 3.5 times in the transverse direction by a tenter transverse stretching machine at 90° C. Further, the sheet was subjected to heat treatment at 100° C. for 10 seconds in the tenter, whereby biaxially oriented film 1.5 $\mu$m thick was prepared.

The film by itself was perforated under the conditions shown in the following table 1.

Further the same film was laminated with paper made of polyester fiber 4 $\mu$m in mean fiber diameter (40 wt %) blended with Manila hemp fiber 15 $\mu$m in mean fiber diameter (60 wt %) by polyvinyl acetate resin coated therebetween in an amount of 0.5 g/m$^2$. The paper was 10 g/m$^2$ in weighing and 35 $\mu$m in thickness. Then silicone releasing agent was coated on the surface of the film in an amount of 0.1 g/m$^2$, thereby obtaining a heat-sensitive stencil material.

Further, by the use of the stencil material thus obtained, a stencil was made under the conditions shown in the following table 1 and printing was done by the use of the stencil.

Embodiment 3

100 parts by weight of polyethylene terephthalate copolymer containing therein 25 mol% of ethylene terephthalate unit, containing therein 0.4 wt % of silica 1.5 $\mu$m in mean particle size, and 0.1 parts by weight of cerotic acid myristyl were fused, kneaded and extruded with a biaxial extruder and then cut into raw material of copolymer polyester resin (viscosity $\eta$=0.62[Pa·s], Tm=197° C.). Then the raw material was dried under vacuum for 5 hours at 150° C. by the use of a rotary dryer. The raw material was extruded by an extruder 40 mm in screw diameter with the cap of the T-die held at 260° C., and was cast on a cooling drum 300 mm in diameter, whereby un-oriented sheet 18 $\mu$m thick was obtained. Then the un-oriented sheet was oriented to 3.2 times in the longitudinal direction by a series of heated rolls at 85° C., and the longitudinally oriented sheet was further oriented to 3.2 times in the transverse direction by a tenter transverse stretching machine at 90° C. Further, the sheet was subjected to heat treatment at 100° C. for 10 seconds in the tenter, whereby biaxially oriented film 1.7 $\mu$m thick was prepared.

The film by itself was perforated under the conditions shown in the following table 1.

Further the same film was laminated with paper made of polyester fiber 4 $\mu$m in mean fiber diameter (40 wt %) blended with Manila hemp fiber 15 $\mu$m in mean fiber diameter (60 wt %) by polyvinyl acetate resin coated therebetween in an amount of 0.5 g/m$^2$. The paper was 10 g/m$^2$ in weighing and 35 $\mu$m in thickness. Then silicone releasing agent was coated on the surface of the film in an amount of 0.1 g/m$^2$, thereby obtaining a heat-sensitive stencil material.

Further, by the use of the stencil material thus obtained, a stencil was made under the conditions shown in the following table 1 and printing was done by the use of the stencil.

Embodiment 4

The same film and heat-sensitive stencil material as those employed in the embodiment 3 were used.

The film by itself was perforated under the conditions shown in the following table 1. Further, by the use of the stencil material, a stencil was made under the conditions shown in the following table 1 and printing was done by the use of the stencil.

Embodiment 5

80 parts by weight of L-lactic acid and 20 parts by weight of hydroxycaproic acid were introduced into a reactor and the mixture was stirred at 145° C., 6000 Pa for 4 hours to distill water out of the mixture. Then 0.05 parts by weight of tin was added and the resultant mixture was further stirred for 3 hours, whereby low polymer was obtained. The lower polymer was subsequently added with 0.2 parts by weight of tin and 200 parts by weight of diphenyl ether and the resultant mixture was subjected to azeotropic dehydration at 148° C., 4400 Pa, and kept react for 30 hours while distilled water and solvent were separated by a water separator and only the solvent was returned to the reactor, whereby L-lactic acid polymer solution was obtained. Then the solution was cooled to 40° C. and the deposit was filtered. Further the deposit was washed with n-hexane and dried under vacuum. Obtained powder was added with 15 Kg of 0.5 N hydrochloric acid and 15 Kg of ethanol and separated by filtration and dried after being stirred, whereby L-lactic acid polymer was obtained.

100 parts by weight of the L-lactic acid polymer thus obtained was mixed with 0.5 parts by weight of calcium carbonate 1.5 $\mu$m in mean particle size and the resultant mixture was extruded and pelletized by a reverse biaxial extruder at 200° C. The obtained pellet was treated at 50° C. under vacuum, and crystallized and dried. Then the pellet was melted and extruded at 200° C. by an extruder 40 mm in screw diameter, and was cast on a cooling drum 300 mm in diameter, whereby un-oriented sheet 20 $\mu$m thick was obtained. Then the un-oriented sheet was oriented to 3.5 times in the longitudinal direction by a series of heated rolls at 65° C., and the longitudinally oriented sheet was further oriented to 3.5 times in the transverse direction by a tenter transverse stretching machine at 70° C. Further, the sheet was subjected to heat treatment at 100° C. for 10 seconds in the tenter, whereby biaxially oriented film 1.6 $\mu$m thick was prepared.

The film by itself was perforated under the conditions shown in the following table 1.

Further the same film was laminated with paper made of polyester fiber 4 $\mu$m in mean fiber diameter (40 wt %) blended with Manila hemp fiber 15 $\mu$m in mean fiber diameter (60 wt %) by polyvinyl acetate resin coated therebetween in an amount of 0.5 g/m². The paper was 10 g/m² in weighing and 35 $\mu$m in thickness. Then silicone releasing agent was coated on the surface of the film in an amount of 0.1 g/m², thereby obtaining a heat-sensitive stencil material.

Further, by the use of the stencil material thus obtained, a stencil was made under the conditions shown in the following table 1 and printing was done by the use of the stencil.

Comparative Example 1

Polypropylene film 3.3. $\mu$m thick (Toray; Torayfan BO2300) was employed.

The film by itself was perforated under the conditions shown in the following table 1.

Further, by the use of the film, stencil material was made in the same manner as in the embodiment 1. Then, by the use of the stencil material thus obtained, a stencil was made under the conditions shown in the following table 1 and printing was done by the use of the stencil.

Comparative Example 2

The same polyester resin as in the embodiment 1 was cast on a cooling drum by extrusion through a T-die, whereby un-oriented sheet 21 $\mu$m thick was obtained. Then the un-oriented sheet was oriented to 3.5 times in the longitudinal direction by a series of heated rolls at 90° C., and the longitudinally oriented sheet was further oriented to 3.5 times in the transverse direction by a tenter transverse stretching machine at 95° C. Further, the sheet was subjected to heat treatment at 120° C. for 10 seconds in the tenter, whereby biaxially oriented film 1.7 $\mu$m thick was prepared. Further a heat-sensitive stencil material was obtained in the same manner as in the embodiment 1. The film by itself was perforated under the conditions shown in the following table 1 and by the use of the stencil material thus obtained, a stencil was made under the conditions shown in the following table 1 and printing was done by the use of the stencil.

The result of measurement of the shapes of the perforations formed in the thermoplastic resin film by itself in the embodiments 1 to 5 and the comparative examples 1 and 2 is shown in the following tables 2 and 3.

In the following table 2, the diameters in the main scanning direction and the sub-scanning direction and the areas of the perforation at the time point t1 at which supply of energy to the heater element was cut and at the time t2 at which enlargement of the perforation was stopped (in the final state) are shown. Further, at the time points t1 and t2, the shape of the perforation was measured under the same conditions.

In the following table 3, the ratios of the diameters and the areas of the perforations at the time point t1 to those at the time point t2, the ratios of the diameters in the main scanning direction and the sub-scanning direction at the time point t2 to the scanning pitches $p_x$ and $p_y$ in the respective directions, and the ratio of the area of the perforation at the time point t2 to the product of the scanning pitches in the main scanning direction and in the sub-scanning direction are shown.

The shapes of the perforations formed in the heat-sensitive stencil material in the embodiments 1 to 5 and the comparative examples 1 and 2 were evaluated in the following manner and the result is shown in the following table 4.

Using the heat-sensitive stencil materials obtained in the embodiments 1 to 5 and the comparative examples 1 and 2, stencil were made by different thermal heads (which were equal to or different from the thermal head employed in a stencil printer RISOGRAPH GR377 (RISO KAGAKU CORPORATION) in resolution) under the conditions shown in the table 1. Each stencil included a black solid portion of 10 mm×10 mm (■) and thin characters formed by one or two dots.

The perforations in the black solid portion of the stencils thus obtained were observed through an optical microscope and (1) perforating performance and (2) sensitivity to perforation of the heat-sensitive stencil materials were evaluated on the basis of the following standards.

(1) Perforating performance of the heat-sensitive stencil materials

⊚: Perforations were of the target size and were uniform in size.

◯: Though perforations were substantially of the target size, the perforations somewhat fluctuated in size.

Δ: Though the size of the perforations were partly insufficient, the stencil was practically acceptable.

X: A substantial part of the perforations were unsatisfactory in size and the stencil was practically unacceptable.

(2) sensitivity to perforation of the heat-sensitive stencil materials

⊚: Perforations of the target size were obtained with very small energy.

○: Perforations of the target size were obtained with relatively small energy.

Δ: Relatively large energy was required to obtain perforations of the target size.

X: Large energy was required to obtain perforations of the target size and perforations of the target size sometimes could not be obtained.

Using the stencils obtained in the embodiments 1 to 5 and the comparative examples 1 and 2, printing was done and the printings obtained were evaluated.

The stencils were manually mounted on the printing drum of a stencil printer RISOGRAPH GR377 (RISO KAGAKU CORPORATION), and printing was done at the room temperature using RISOGRAPH INK GR-HD under the standard conditions of RISOGRAPH GR377 (power source ON). The printings obtained were evaluated on (3) quality of the solid portion, (4) blur in the thin characters, (5) saturation in the thin characters and (6) offset on the basis of the following standards. The result is shown in the following table 4.

(3) Quality of the Solid Portions.

The degree of fluctuation in density by parts (microscopic parts not larger than about 1 mm in cycle) due to fluctuation in mean density and shape of the perforations were subjectively evaluated on the basis of the following standards.

⊚: Density was sufficient and no fluctuation in density was felt.

○: Slight fluctuation in density was felt but density was practically acceptable. Both reproducibility of solid portions in text originals and reproducibility of tones of picture originals were acceptable.

Δ: Though reproducibility of solid portions in text originals was acceptable, density was slightly poor and reproducibility of tones of shadow portions of picture originals was insufficient.

X: Density was poor and fluctuation in density was remarkable. Both reproducibility of solid portions in text originals and reproducibility of tones of shadow portions of picture originals were unacceptable.

(4) Blur in the Thin Characters.

The degree of blur (interruption of a pattern which was to be continuous) in the thin characters due to fluctuation in shape of the perforations were subjectively evaluated on the basis of the following standards.

⊚: No blur was felt.

○: Though slight blur was felt, reproducibility of thin characters (black characters on a white ground) in text originals and reproducibility of tones of highlight portions of picture originals were both acceptable.

Δ: Though reproducibility of thin characters (black characters on a white ground) in text originals was acceptable, reproducibility of tones of highlight portions of picture originals was poor.

X: Blur was remarkable and reproducibility of thin characters (black characters on a white ground) in text originals and reproducibility of tones of highlight portions of picture originals were both unacceptable.

(5) Saturation in the Thin Characters.

The degree of saturation in the thin characters (loss of the white ground between adjacent two patterns) due to fluctuation in shape of the perforations were subjectively evaluated on the basis of the following standards.

⊚: No saturation was felt.

○: Though slight saturation was felt, reproducibility of thin characters (black characters on a white ground) in text originals and reproducibility of tones of shadow portions of picture originals were both acceptable.

Δ: Though reproducibility of thin characters (black characters on a white ground) in text originals was acceptable, reproducibility of tones of shadow portions of picture originals was poor.

X: Saturation was remarkable and reproducibility of thin characters (black characters on a white ground) in text originals and reproducibility of tones of shadow portions of picture originals were both unacceptable.

(6) Offset

The degree of offset (the back side of a printed sheet is stained by ink on the surface of the preceding printed sheet) was subjectively evaluated on the basis of the following standards.

⊚: No offset was felt.

○: Though slight offset was felt, the offset was at a such a level as to involve no problem even in originals where the solid portion was large and a large amount of ink was transferred to the printings. The printings were acceptable for a formal use.

Δ: Offset was at a level such that no problem was involved in parts such as thin characters (black characters on a white ground) or highlight portions where the amount of ink transferred to the printings was small but stain was remarkable in the part such as a large solid portion where the amount of ink transferred to the printings was large. The printings were unacceptable for a formal use though acceptable for an informal use.

X: Offset was remarkable almost over the entire area of the original. The printings were unacceptable for both a formal use and an informal use.

As shown in the table 3, the ratios $dx_1/dx_2$ of the diameters of the perforations in the main scanning direction at the time point t1 at which supply of energy to the heater element was cut to those at the time point t2 at which enlargement of the perforations was stopped (in the final state) (and the reciprocals thereof $dx_2/dx_1$) in the embodiments 1 to 5 were 93% (107%), 80% (126%), 73% (138%), 69% (145%) and 91% (110%). Further, the ratios $dy_1/dy_2$ of the diameters of the perforations in the sub-scanning direction at the time point t1 at which supply of energy to the heater element was cut to those at the time point t2 at which enlargement of the perforations was stopped (in the final state) (and the reciprocals thereof $dy_2/dy_1$) in the embodiments 1 to 5 were 95% (105%), 86% (117%) 83% (121%), 75% (133%) and 86% (117%). Further, the ratios $a_1/a_2$ of the areas of the perforations at the time point t1 at which supply of energy to the heater element was cut to those at the time point t2 at which enlargement of the perforations was stopped (in the final state) (and the reciprocals thereof $a_2/a_1$) in the embodiments 1 to 5 were 89% (113%), 68% (147%), 60% (166%), 52% (194%) and 78% (128%). As can be understood from the table 4, the evaluation of the perforating performance and sensitivity to perforation of the stencil materials of the embodiments 1 to 5 were all satisfactory. Further, evaluation of the printings printed by the use of the stencils made of the stencil materials of embodiments 1 to 5 on quality of the solid portion, blur in the thin characters, saturation in the thin characters and offset were all satisfactory.

To the contrast, as shown in the table 3, the ratios $dx_1/dx_2$ of the diameters of the perforations in the main scanning direction at the time point t1 to those at the time point t2 (and the reciprocals thereof $dx_2/dx_1$) in the comparative examples 1 and 2 were 41% (243%) and 97% (103%). Further, the ratios $dy_1/dy_2$ of the diameters of the perforations in the sub-scanning direction at the time point t1 to those at the time point t2 (and the reciprocals thereof $dy_2/dy_1$) in the comparative examples 1 and 2 were 45% (224%) and 99% (101%). Further, the ratios $a_1/a_2$ of the areas of the perforations at the time point t1 to those at the time point t2 (and the reciprocals thereof $a_2/a_1$) in the comparative examples 1 and 2 were 18% (546%) and 96% (104%). As can be understood from the table 4, the evaluation of the perforating performance and sensitivity to perforation of the stencil materials of the comparative examples 1 and 2 were unsatisfactory. Further, evaluation of the printings printed by the use of the stencils made of the stencil materials of the comparative examples 1 and 2 were unsatisfactory on quality of the solid portion and blur in the thin characters.

On the basis of the fact that the state of perforation as measured in the thermoplastic film by itself has a high correlation with that as measured in the thermoplastic film laminated on the porous support sheet as described above, the result of the above experiment proves that discreteness of the perforations can be ensured, the shape of the perforations can be stabilized and sensitivity to perforation can be excellent when supply of energy to the heat source is cut at a time the diameter of the perforation becomes not smaller than 65% and not larger than 95% (preferably 72~92%, and more preferably 75~90%) of a target area of the perforation, or at a time the area of the perforation becomes not smaller than 42% and not larger than 90% (preferably 49~85%, and more preferably 56~81%) of a target diameter of the perforation.

When the heat shrinkable properties of the thermoplastic resin film for the stencil material are such that the diameter of the perforation is enlarged after cutting supply of energy to the heat source to from 105% to 154% of that at the time the supply of energy to the heat source is cut, the perforations can be discrete, the shape of the perforations can be stabilized, an excellent sensitivity to perforation can be ensured and a high perforating speed can be ensured. Further, the result of the above experiment proves that discreteness of the perforations can be ensured, the shape of the perforations can be stabilized and sensitivity to perforation can be excellent when the heat shrinkable properties of the thermoplastic resin film are such that the diameter of the perforations is enlarged after cutting supply of energy to the heat source to from 105% to 154% (preferably 109~140%, and more preferably 112~133%) of that at the time the supply of energy to the heat source is cut, or the area of the perforations is enlarged after cutting supply of energy to the heat source to from 110% to 237% (preferably 119~196%, and more preferably 125~177%) of that at the time the supply of energy to the heat source is cut.

Further, when the target diameters of the perforation in the main scanning direction and the sub-scanning direction, that is, the diameters in the main scanning direction and the sub-scanning direction to which the perforation is expected to be enlarged after cut of the energy supply, are set not smaller than 45% and not larger than 80% of the scanning pitches in the respective directions, or when the target area of the perforation, that is, the area to which the perforation is expected to be enlarged after cut of the energy supply, is set to be not smaller than 20% and not larger than 50% of the product of the scanning pitches in the main scanning and sub-scanning directions, the amount of ink transferred through the stencil obtained can be such that offset can be avoided in solid parts while necessary density is ensured, and thin character parts can be sufficient in width and density.

Though, in the embodiments 1 to 5 described above, the stencil materials comprises a porous support sheet and a thermoplastic resin film laminated with the support sheet, the stencil materials may comprise only the thermoplastic resin film.

TABLE 1

|  |  |  | emb. 1 | emb. 2 | emb. 3 | emb. 4 | emb. 5 | co. ex. 1 | co. ex. 2 |
|---|---|---|---|---|---|---|---|---|---|
| film | polymer |  | A | B | C | C | D | E | A |
|  | thickness | μm | 1.0 | 1.5 | 1.7 | 1.7 | 1.6 | 3.5 | 1.7 |
| thermal | resolution (main) | Dpi | 400 | 800 | 400 | 600 | 800 | 300 | 400 |
| head | resolution (sub) | Dpi | 400 | 800 | 400 | 600 | 800 | 300 | 400 |
|  | scanning pitch (main) | μm | 63.5 | 31.8 | 63.5 | 42.3 | 31.8 | 84.7 | 63.5 |
|  | scanning pitch (sub) | μm | 63.5 | 31.8 | 63.5 | 42.3 | 31.8 | 84.7 | 63.5 |
|  | element size (main) | μm | 30 | 15 | 30 | 20 | 15 | 45 | 30 |
|  | element size (sub) | μm | 40 | 19 | 40 | 25 | 19 | 60 | 40 |
|  | mean power | mW | 120 | 49 | 169 | 107 | 44 | 197 | 84 |
|  | energizing time | μs | 400 | 350 | 200 | 240 | 500 | 470 | 400 |
|  | energy supplied | μj | 48.0 | 17.3 | 33.8 | 25.7 | 22.1 | 92.6 | 33.6 |

A: ethylene terephthalate-ethylene isophthalate copolymer (copolymerized with 14 mol % of isophthalic acid)
B: ethylene terephthalate-ethylene isophthalate copolymer (copolymerized with 20 mol % of isophthalic acid)
C: ethylene terephthalate-ethylene isophthalate copolymer (copolymerized with 25 mol % of isophthalic acid)
D: L-lactic acid polymer
E: Polypropylene resin

TABLE 2

|  |  | emb. 1 | emb. 2 | emb. 3 | emb. 4 | emb. 5 | co. ex. 1 | co. ex. 2 |
|---|---|---|---|---|---|---|---|---|
| t1 | μs | 400 | 350 | 200 | 240 | 500 | 470 | 400 |
| t2 | μs | 556 | 660 | 358 | 358 | 912 | 852 | 457 |
| $dx_1$ | μm | 32.4 | 17.5 | 24.0 | 17.6 | 20.0 | 15.0 | 28.5 |
| $dy_1$ | μm | 30.1 | 15.0 | 27.3 | 14.4 | 15.0 | 20.0 | 27.7 |
| $a_1$ | μm² | 816.4 | 219.8 | 548.7 | 212.9 | 251.3 | 251.3 | 661.2 |
| $dx_2$ | μm | 34.8 | 22.0 | 33.0 | 25.6 | 22.0 | 36.5 | 29.3 |
| $dy_2$ | μm | 31.7 | 17.5 | 33.0 | 19.2 | 17.5 | 44.8 | 28.0 |
| $a_2$ | μm² | 922.3 | 322.4 | 912.6 | 413.0 | 322.4 | 1372.4 | 687.1 |

TABLE 3

|  |  | emb. 1 | emb. 2 | emb. 3 | emb. 4 | emb. 5 | co. ex. 1 | co. ex. 2 |
|---|---|---|---|---|---|---|---|---|
| $dx_1/dx_2$ | % | 93 | 80 | 73 | 69 | 91 | 41 | 97 |
| $dy_1/dy_2$ | % | 95 | 86 | 83 | 75 | 86 | 45 | 99 |
| $a_1/a_2$ | % | 89 | 68 | 60 | 52 | 78 | 18 | 96 |

TABLE 3-continued

|   | | emb. 1 | emb. 2 | emb. 3 | emb. 4 | emb. 5 | co. ex. 1 | co. ex. 2 |
|---|---|---|---|---|---|---|---|---|
| $dx_2/dx_1$ | % | 107 | 126 | 138 | 145 | 110 | 243 | 103 |
| $dy_2/dy_1$ | % | 105 | 117 | 121 | 133 | 117 | 224 | 101 |
| $a_2/a_1$ | % | 113 | 147 | 166 | 194 | 128 | 546 | 104 |
| $dx_2/p_x$ | % | 54.8 | 69.2 | 52.0 | 60.5 | 69.2 | 43.1 | 46.1 |
| $dy_2/p_y$ | % | 49.9 | 55.0 | 52.0 | 45.4 | 55.0 | 52.9 | 44.1 |
| $a_2/p_x \cdot p_y$ | % | 22.9 | 31.9 | 22.6 | 23.1 | 31.9 | 19.1 | 17.0 |

TABLE 4

| | emb. 1 | emb. 2 | emb. 3 | emb. 4 | emb. 5 | co. ex. 1 | co. ex. 2 |
|---|---|---|---|---|---|---|---|
| shape; performance | ○ | ◉ | ◉ | ◉ | ○ | Δ | X |
| sensitivity | ◉ | ◉ | ○ | ○ | ◉ | X | ◉ |
| printings; solid quality | ○ | ◉ | ○ | ○ | ◉ | X | X |
| blur | ○ | ◉ | ◉ | ◉ | ◉ | X | X |
| saturation | ◉ | ○ | ◉ | ○ | ○ | ◉ | ◉ |
| offset | ○ | ◉ | ◉ | ◉ | ○ | ○ | ○ |

What is claimed is:

1. A method of making a stencil by thermally forming perforations arranged in both a main scanning direction and a sub-scanning direction in a thermoplastic resin film of heat-sensitive stencil material by the use of a heat source which is heated through a supply of energy, the heat source having a scanning pitch in each of the scanning directions, the method comprising the steps of:

cutting the supply of energy to the heat source at a time when a diameter of the perforations becomes not smaller than 65% and not larger than 95% of a target diameter of the perforations.

2. A method as defined in claim 1, in which the target diameters of the perforations in the main scanning direction and the sub-scanning direction are set not smaller than 45% and not larger than 85% of the scanning pitches in the respective directions.

3. A method as defined in claim 1, in which the target area of the perforations is set not smaller than 20% and not larger than 50% of the product of the scanning pitches in the main scanning direction and in the sub-scanning direction.

4. A method of making a stencil by thermally forming perforations arranged in both a main scanning direction and a sub-scanning direction in a thermoplastic resin film of heat-sensitive stencil material by the use of a heat source which is heated through a supply of energy, the heat source having a scanning pitch in each of the scanning directions, the method comprising the steps of:

cutting the supply of energy to the heat source at a time when an area of the perforations becomes not smaller than 42% and not larger than 90% of a target area of the perforations.

5. A method as defined in claim 4, in which the target area of the perforations is set not smaller than 20% and not larger than 50% of the product of the scanning pitches in the main scanning direction and in the sub-scanning direction.

6. A method as defined in claim 4, in which the target diameters of the perforations in the main scanning direction and the sub-scanning direction are set not smaller than 45% and not larger than 80% of the scanning pitches in the respective directions.

* * * * *